US006559201B2

(12) United States Patent  
Simendinger, III

(10) Patent No.: US 6,559,201 B2  
(45) Date of Patent: May 6, 2003

(54) ANTIFOULING COATING COMPOSITION

(75) Inventor: William H. Simendinger, III, Raleigh, NC (US)

(73) Assignee: Microphase Coatings, Inc., Garner, NC (US)

( * ) Notice: Subject to any disclaimer, the term of this patent is extended or adjusted under 35 U.S.C. 154(b) by 0 days.

(21) Appl. No.: 09/781,876

(22) Filed: Feb. 12, 2001

(65) Prior Publication Data

US 2002/0013385 A1 Jan. 31, 2002

Related U.S. Application Data

(63) Continuation-in-part of application No. 09/586,378, filed on Jun. 2, 2000, now Pat. No. 6,313,193.

(51) Int. Cl.⁷ .............................. C08K 5/35; C08K 5/20; C08K 5/04
(52) U.S. Cl. .................... 523/122; 524/95; 524/230; 524/300; 524/322; 524/399; 524/400; 524/403; 524/490; 524/494; 524/588; 428/446
(58) Field of Search ................................ 523/122; 524/95, 524/230, 300, 322, 399, 400, 403, 490, 494, 588; 428/446

(56) References Cited

U.S. PATENT DOCUMENTS

| | | | |
|---|---|---|---|
| 4,602,959 A | 7/1986 | Kurita et al. | 106/18.32 |
| 4,725,501 A | 2/1988 | Rukavina et al. | 428/412 |
| 4,814,017 A | 3/1989 | Yoldas et al. | 106/287.12 |
| 4,816,288 A | 3/1989 | Rukavina et al. | 427/387 |
| 4,990,547 A | 2/1991 | Stovicek | 424/405 |
| 5,068,277 A | 11/1991 | Rastko et al. | 524/441 |
| 5,096,488 A | 3/1992 | Stovicek | 106/18.32 |
| 5,173,110 A | 12/1992 | Stovicek | 106/18.32 |
| 5,218,059 A | 6/1993 | Kishihara et al. | 525/477 |
| 5,298,060 A | 3/1994 | Harakal et al. | 106/15.05 |
| 5,331,074 A | 7/1994 | Slater et al. | 528/14 |
| 5,433,941 A | 7/1995 | Patel | 424/50 |
| 5,593,732 A | 1/1997 | Griffith | 427/407.1 |
| 5,663,215 A | 9/1997 | Milligan | 523/122 |
| 5,688,851 A | 11/1997 | Kress | 524/430 |
| 5,958,116 A | 9/1999 | Kishihara et al. | 106/15.05 |
| 6,013,724 A | 1/2000 | Mizutani et al. | 524/588 |
| 6,045,869 A | 4/2000 | Gesser et al. | 427/385.5 |

FOREIGN PATENT DOCUMENTS

| | | | | |
|---|---|---|---|---|
| EP | 0 563 939 A1 | 10/1993 | | C09D/5/14 |
| EP | 0 664 322 A1 | 7/1995 | | C08L/83/07 |
| EP | 0 851 009 A2 | 7/1998 | | C09D/5/16 |

OTHER PUBLICATIONS

Naval Research Reviews, *Biofouling*, Office of Naval Research, Four/1997 vol. XLIX.

*Primary Examiner*—Kriellion A. Sanders
(74) *Attorney, Agent, or Firm*—Myers Bigel Sibley & Sajovec, PA

(57) ABSTRACT

The antifouling composition of the present invention includes a glassy matrix formed by crosslinking a mixture of a silanol-terminated silicone and an alkoxy functionalized siloxane to provide an interpenetrating polymer network of glass and silicone and at least two materials capable of microphase separation, at least one of which is graftable to the glassy matrix.

95 Claims, No Drawings

ANTIFOULING COATING COMPOSITION

RELATED APPLICATION

This present application is a continuation-in-part of U.S. Ser. No. 09/586,378 filed Jun. 2, 2000, now U.S. Pat. No. 6,313,193 entitled "Antifouling Coating Composition" the disclosure of which is incorporated herein by reference in its entirety

FIELD AND BACKGROUND OF THE INVENTION

The present invention relates to an antifouling coating composition, and more particularly to an antifouling coating composition for use with underwater structures such as ships, port facilities, buoys, pipelines, bridges, submarine stations, submarine oil field excavation facilities, water conduit raceway tubes in power plants, cultivating fishing nets, stationary fishing nets. Such coating composition is suitable for preventing underwater living things from adhering and growing on the surface of the underwater structure.

Biofouling, the growth of barnacles, seaweeds, tube-worms and other marine organisms on the hulls of ocean-going vessels, and other underwater structures, cause the international marine community billions of dollars a year. In the case of ocean-going vessels, most of this money goes for the extra fuel needed to overcome the increased drag on vessels. Some of it is spent for hull cleaning and repainting and for the upkeep on propulsion equipment. Of the total amount of money, a tiny amount is invested in the search for better antifouling inhibitors.

One currently used hull antifouling coating contains species such as tributyltin compounds or copper oxide and function through leaching of the toxicant into the marine environment. The resulting environmental hazards of introducing such toxicants into the marine ecosystem include disruption of natural ecocycles for many commercially important shellfish and pollution of entire food chains. The removal and disposal of toxicant-containing coatings from ships and other structures also pose separate environmental hazards, driving up the cost of refurbishment.

An alternative approach is to use acrylic acid monomer compositions which are water soluble, i.e., a polyester resin with an acrylic acid group. Such coatings include a biocide, which after a certain amount of time becomes inactive. The composition, because it is water soluble, wears off over time, i.e., is ablative, and exposes new and active biocide at the surface. Such a composition is known as a self-polishing composition. Thus the alternative approach has been to employ a polymeric coating to function as a fouling release coating. Poly(dimethylsiloxane) (PDMS)based coatings have properties which meet some of those requirements. On the other hand, as noted, studies have shown that such a cured PDMS material becomes unstable when immersed in water for three months.

Another specific approach involves the use of a composition containing a majority by weight as resin-solid content a reaction-curable silicone resin composition, a silicone resin having the specific average molecular weight and viscosity and an alkoxy group at its molecular terminal. While such a composition exhibits non-toxic characteristics, it is silicone based and in addition to the discussed disadvantages, subject to premature wear requiring frequent maintenance in the form of reapplication of the coating.

In accordance with the invention, an antifouling coating composition, which is a silicone modified glass, is provided which is extremely effective in preventing fouling, and which is highly durable over time.

SUMMARY OF THE INVENTION

The antifouling composition of the present invention compromises a glassy matrix formed by crosslinking a mixture of a silanol-terminated silicone and an alkoxy functionalized siloxane to provide an interpenetrating polymer network of glass and silicone and at least two materials capable of microphase separation, at least one of which is graftable to the glassy matrix.

The present invention also provides a method of treating a substrate to prevent fouling thereof. The method includes applying to the substrate a mixture of a silanol-terminated silicone and an alkoxy functionalized siloxane, and at least two materials capable of microphase separation. Thereafter crosslinking the mixture to provide an interpenetrating polymer network of glass and silicone to which is grafted at least one of the materials capable of microphase separation.

Optionally the mixture/antifouling composition can include an agent capable of preventing or inhibiting slime (e.g., algae, bacteria, protozoa, diatoms, etc.) from growing on the surface of the coating. While in most cases, such agent will be included in the composition, there are instances when slime is not an issue, and the anti-slime agent can be omitted. Suitable agents capable of preventing or inhibiting slime include surfactants, emulsifiers, enzymes, silver compounds, quaternary amine compounds, sulfa-based antimicrobial compounds, saponin and cholesterol, and mixtures and blends thereof.

DETAILED DESCRIPTION OF THE INVENTION

The present invention will be more fully understood by reference to the following description and examples. Variations and modifications of the embodiments of the invention can be substituted without departing from the principles of the invention, as will be evident to those skilled in the art.

The present invention is based on the discovery that a modified glassy matrix can be combined with at least two materials capable of microphase separation to make a uniform and tough antifouling coating for use on surfaces, particularly marine surfaces in an underwater environment.

The glassy matrix serves to provide a carrier or support material composition. The matrix provides critical properties such as good adhesion to the substrate on which the formulation is applied as a coating, toughness, crack resistance, durability, abrasion resistance and stability in an aqueous environment. The glassy matrix is formed by crosslinking a mixture of a silanol-terminated silicone and alkoxy functionalized siloxane to provide a silicate glass. Typically, the glassy matrix is crosslinked using an organotitanate or tin catalyst agent.

Suitable functionally-terminated silicones include polydimethylsiloxane silanol terminated, vinyl terminated and amino terminated. Such silicones have low tear strength and can be toughened by incorporating glass ($SiO_2$) into the structure. Thus, an alkoxy functionalized siloxane can be included. Suitable alkoxy functionalized siloxanes include polydimethylsiloxane, tetraethoxy silane, tetramethoxy silane, and polydimethoxy siloxane.

One manner of forming the glassy matrix is using a Sol-Gel process employing an organotitanate compound, for example, a titanium alkoxide compound such as titanium methoxide, titanium ethoxide, titanium isopropoxide, titanium propoxide, titanium butoxide, titanium ethylhexoxide, titanium diisopropoxide (bis 2,4 pentanedionate), titanium diisopropoxide bis(ethylacetoacetate), or any other type of titanium alkoxide compound. These titanium alkoxide compounds can be used separately or in any combination. Although titanium alkoxides are given as examples, other organotitanate compounds can be used. The glassy matrix can also include a carboxylic acid compound. Silica gel is optional to inhibit the crosslinking reaction. Silica gel is used if storage over a long period of time is an issue. This is because it stores moisture. Alternatively, only silica gel can be used in place of the carboxylic acid compound. However, this does not work as well and a lot of silica gel is required.

With respect to the Sol-Gel process, as is well know to those of ordinary skill in the art, the Sol-Gel process is conventional, and typically produces a Sol-Gel glass which results from an optically transparent amorphous silica or silicate material produced by forming interconnections in a network of colloidal submicrometer particles under increasing viscosity until the network becomes completely rigid, with about one-half the density of glass.

In addition, the matrix can also include means for inhibiting or slowing the crosslinking reaction. Exemplary means for inhibiting include propionic or octonoic acid. Such agents permit the surface of the substrate to be coated to be painted before the formulation cures or crosslinks. The matrix can include various fillers and viscosity control agents such as mica, fumed silica, silica, kaolin, bentonite, zinc oxide, iron oxide, polytetrafluoroethylene powder, ultra high molecular weight polyethylene powder, high, medium and low molecular weight polyethylene powder, or other appropriate fillers, as will be readily apparent to those of ordinary skill in the art, can be used.

The two materials capable of microphase separation serve to prevent barnacles or other organisms from attaching or staying attached to the coating and thus the substrate. The material comprises at least one material, preferably a liquid, which in addition to its separation aspects, one of which is capable of being grafted into the glassy matrix. A material capable of microphase separation is a material that because of physical or chemical interactions between (among) the materials substantially continuously phase separates or moves. Such separation or movement in effect provides a substantially constant scraping motion thereby preventing the build up of slim or foul on the surface of the substrate.

One of the materials capable of microphase separation and graftable into the glassy matrix may be a vinyl terminated polydimethyl siloxane polymer reacted with dimethylethoxy silane and triethyl silane using a hydrosilylation reaction. Another microphase separatable material which can be employed is a methylhydrosiloxane polymer which is side-chain grafted with octene and vinyltriethoxy silane using a platinum-activated hydrosilylation reaction. Similarly, any hydrocarbon compound having a carbon atom chain of up to C20 can be used. Yet still further a methylhydrosiloxane polymer which is side-chain grafted with styrene and vinyltriethoxy silane using a platinum-activated hydrosilylation reaction can also be used. In this regard, it is noted that the platinum catalyst serves to react the hydride and the vinyl in the initial formulation. No platinum curing occurs in the final product provided in the field. Yet still further, a liquid hydrocarbon, such as polydecene, can also be used. In addition, other materials such as octanoic acid, heptanoic acid, hexanoic acid, decanoic acid, lauric acid, oleic acid, linoleic acid, linolenic acid, stearic acid, or any carboxylic acid containing a linear carbon chain of up to about C20 can be employed. Similarly, aluminum oleate, aluminum stearate, copper oleate, copper stearate, calcium stearate, magnesium stearate, or any fatty acid salt complex can be employed. In this regard, it is noted that of the above components, oleic acid is preferred as is aluminum oleate and aluminum stearate. Another microphase separatable material which can be employed is fluorotelomer intermediate available as Zonyl® from duPont.

The antifouling composition optionally may include an agent capable of preventing slime growth such as algae, bacteria, protozoa, diatoms and the like. Particularly preferred are surfactants and emulsifiers such as sorbitan mono- and tri-oleate (Span® products), polyoxyethylene sorbitan mono-oleate, polyoxyethylene sorbitan tri-oleate, and polyoxyethylene sorbitan mono-sterate (Tween® products), saponin, and cholesterol. Other suitable antifouling agents include silver compounds such as silver powder, silver oxide, silver chloride, silver carbonate, silver acetate and silver citrate; quaternary amine compounds such as cetrimide; isoniazid; benzalkonium chloride; sulfa-based antimocrobial compounds such as sulfanilamide, sulfaguanidine, sulfathiazole, sulfacetamide, sulfabenzamide and sulfamethiazole; saponin; and cholesterol. An exemplary antimicrobial compound is Irgarol™, which is a slime inhibitor manufactured by, and commercially available from Ciba Geigy.

Additional additives which can be added to the formulation and can include aminopropyltriethoxy silane which serves to increase adhesion and can be used, for example, when the coating composition is used on the running gear of a vessel. Fumed silica can be used for thixotropic control, i.e., to increase viscosity. Pigments can be used to alter the color, and certain phosphates can also be added for anticorrosion properties.

The glassy matrix preferably comprises about 20 to 90 percent by weight of the composition; the liquid material capable of liquid phase separation preferably comprises about 1 to 30 percent by weight of the composition; and the agent capable of preventing slime preferably comprises about 0.1 to 25 percent by weight of the composition.

In operation, the antifouling composition of the present invention can be applied to a substrate by roll-coating, brush, spray coating dipping and the like. As discussed above, it is preferred that the user mix the catalyst with the other components right before or substantially contemporaneously with application to form the interpenetrating polymer network of glass and silicone on the surface of the substrate.

EXAMPLES

The present invention is illustrated in greater detail by the following examples and comparative examples, in which "part" means "part by weight" unless otherwise expressed. The examples are not to be construed as limiting the scope of the present invention.

Example 1

| % by Weight | Component |
| --- | --- |
| 14.35 | 100 cs polydimethylsiloxane silanol terminated |
| 4.91 | octanoic acid or propiomc acid |
| 19.25 | polydiethoxysiloxane |
| 2.45 | silica gel |

-continued

| % by Weight | Component |
|---|---|
| 20.38 | titanium isopropoxide |
| 26.16 | mica (muscovite) |
| 5.0* | 1000 cs polydimethyisiloxane (triethyl silane and dimethyl ethoxy silane terminated) |
| 5.0* | poly (octylmethyl-co-vinyltriethoxy silane methyl siloxane) |
| 2.5 | silver powder |

Example 2

| % by Weight | Component |
|---|---|
| 16.43 | titanium isopropoxide |
| 8.15 | oleic acid |
| 15.50 | polydiethoxy siloxane |
| 25.83 | mica (50 micron) |
| 11.59 | 100 cs polydimethylsiloxane silanol terminated |
| 10.0* | poly (octylmethyl-co-vinyltriethoxy silane methyl siloxane) |
| 10.0* | 1000 cs polydimethylsiloxane (triethyl silane and dimethyl ethoxy silane terminated) |
| 2.5 | silver oxide (1.0 micron) |

*Phase separate components

Example 3

| % by Weight | Component |
|---|---|
| 18.55 | titanium isopropoxide |
| 9.20 | oleic acid |
| 17.49 | polydiethoxy siloxane |
| 29.21 | mica (50 micron) |
| 13.05 | 100 cs polydimethylsiloxane silanol terminated |
| 5.0* | poly (octylmethyl-co-vinyltriethoxy silane methyl siloxane) |
| 5.0* | 1000 cs polydimethylsiloxane (triethyl silane and dimethyl ethoxy silane terminated) |
| 2.5 | Silver oxide (1.0 micron) |

*Phase separate components

Example 4

| % by Weight | Component |
|---|---|
| 17.48 | titanium isopropoxide |
| 8.76 | oleic acid |
| 16.48 | polydiethoxy siloxane |
| 27.54 | mica (50 micron) |
| 11.27 | 100 cs polydimethylsiloxane silanol terminated |
| 3.74* | poly (octylmethyl-co-vinyltriethoxy silane methyl siloxane) |
| 11.27* | 1000 cs polydimethylsiloxane (triethyl silane and dimethyl ethoxy silane terminated) |
| 2.5 | silver oxide (1.0 micron) |

*Phase separate components

Example 5

| % by Weight | Component |
|---|---|
| 17.48 | titanium isopropoxide |
| 8.67* | oleic acid |
| 16.48 | polydiethoxy siloxane |
| 27.55 | mica (50 micron) |
| 12.32 | 100 cs polydimethylsiloxane silanol terminated |
| 10.0* | 1000 cs polydimethylsiloxane (triethyl silane and dimethyl ethoxy silane terminated) |
| 2.5 | silver oxide (1.0 micron) |

*Phase separate components

Example 6

| % by Weight | Component |
|---|---|
| 16.93 | titanium isopropoxide |
| 4.3 | heptanoic acid |
| 15.99 | polydiethoxy siloxane |
| 28.36 | mica (50 micron) |
| 11.92 | 100 cs polydimethylsiloxane silanol terminated |
| 20.0* | poly (octyl methyl-co-ethylbenzene methyl-co-vinyl triethoxysilane methyl siloxane) |
| 2.5 | silver powder (1.0 micron) |

*Phase separate components

Example 7

| % by Weight | Component |
|---|---|
| 17.94 | titanium isopropoxide |
| 10.0* | oleic acid |
| 16.94 | polydiethoxy siloxane |
| 30.0 | mica (50 micron) |
| 12.62 | 100 cs polydimethylsiloxane silanol terminated |
| 10.0* | 1000 cs polydimethylsiloxane (triethyl silane and dimethyl etboxy silane terminated) |
| 2.5 | silver powder (1.0 micron) |

*Phase separate components

Example 8

| % by Weight | Component |
|---|---|
| 16.93 | titanium isoproposide |
| 4.30 | heptanoic acid |
| 15.99 | polydiethoxy siloxane |
| 28.36 | mica (50 micron) |
| 11.92 | 100 cs polydimethylsiloxane silanol terminated |
| 10.0* | 1000 cs polydimethylsiloxane (triethylsilane and dimethyl ethoxy silane terminated) |
| 2.5 | siiver powder (1.0 micron) |

*Phase separate components

Example 9

| % by Weight | Component |
|---|---|
| 16.93 | titanium isopropoxide |
| 4.30 | heptanoic acid |
| 15.99 | polydiethoxy siloxane |
| 28.39 | mica (50 micron) |
| 11.92 | 100 cs polydimethylsiloxane silanol terminated |
| 5.0* | aluminum oleate |
| 15.0* | 1000 cs polydimethylsiloxane (triethyl silane and dimethyl ethoxy silane terminated |
| 2.5 | silver powder (1.0 micron) |

*Phase separate components

Example 10

| % by Weight | Component |
|---|---|
| 18.75 | titanium isopropoxide |
| 17.70 | polydiethoxy siloxane |
| 4.88 | propionic acid |
| 29.51 | mica (muscovite) |
| 16.61 | 100 cs polydimethylsiloxane silanol terminated |
| 10.0* | 1000 cs polydimethylsiloxane-dimethyl ethoxy silane terminated |
| 3.0 | benzalkonium chloride* |

*Benzalkonium chloride contains alkyl carbon chains from C14 to C20. As a result, this material can be both a phase separation component and an effective slimicide.

As may be appreciated, in order to commercially provide the components for the coating, they must be kept separated so that a reaction does not occur prior to application on a surface. Thus, a typical commercial product is provided in two parts as follows:

Example 11

| % by Volume of A & B | | Component |
|---|---|---|
| Part A | | |
| % by Volume of A | | |
| 32.00 | 16.16 | 100 cs polydimethylsiloxane silanol terminated |
| 19.77 | 10.00 | 1000 cs polydimethylsiloxane dimethyl ethoxy silane terminated |
| 35.34 | 17.70 | polydiethoxy siloxane |
| 12.88 | 29.51 | mica |
| Part B | | |
| % by Volume of B | | |
| 37.90 | 18.75 | titanium isopropoxide |
| 9.87 | 4.88 | propionic acid |
| | 17.70 | polydiethoxy siloxane |
| 6.10 | 3.00 | benzalkonium chloride |
| 46.13 | 29.51 | mica |

In preparing the mixture for being applied, parts A and B, for all formulations, should be combined and mixed using a mechanical mixing device for about three (3) to about five (5) minutes. Such a device can be a paint shaker, electrically powered stirrer or like device. After mixing, the coating can be kept in a sealed container for up to about six (6) hours before use. When applied, for example, with brush, roller, or sprayer, curing of the coating occurs rapidly as it is fashioned into a thin layer on the surface. The coating will be substantially tack free in about fifteen (15) to about thirty (30) minutes, and will be serviceable after about twenty-four (24) hours. Increased temperature and/or humidity will increase the cure rate, but the coating can still be applied at temperatures of about 32° F. to about 100° F.

In the previous discussion specific viscosities have been given for the hydro or hydroxy functionalized silicones. However, the formulation for the hydro or hydroxy functional silicones is not limited to those viscosities and can range from about 20 to about 115,000 centistokes. In terms of molecular weight, this corresponds to a molecular weight of about 400 g/mol to about 140,000 g/mol. The vinyl functionalized silicone polymers are typically described previously as being 1000 centistokes, but can also range from about 0.7 centistokes to about 165,000 centistokes, or about 186 g/mol to about 155,000 g/mol.

With respect to titanate silicate ratios, the ratio of the titanate to silicate can vary from about 1 mol % of the reactive titanate groups to about 99 mol % reactive silicate groups to about 99 mol % of the reactive titanate groups to about 1 mol % of the reactive silicate groups. An example of this is as follows. Polydiethoxy siloxane contains two reactive groups per molecular repeat unit. Titanium isopropoxide contains four (4) reactive molecular groups per molecule. A fifty percent (50%) ratio of the reactive groups would mean that there would be one half (½) mole of titanium isopropoxide per 1 mole polydiethoxy siloxane molecular repeat units. A twenty-five percent (25%) ratio would mean that there would be one (1) mole of titanium isopropoxide per six (6) moles of polydiethoxy siloxane repeat units. In this regard a preferred ratio would be about 50/50, with a most preferred ratio being about 25 titanate and about 75 silicate. The most preferred ratio enhances bonding to the filler material.

In terms of two-part commercial availability as discussed above, other two-part formulations are set forth in the following additional examples.

Example 12

| | Component |
|---|---|
| | Part A |
| Volume % A | |
| 21.34 | 100 cs polydimethyl siloxane-silanol terminated |
| 38.96 | poly(octyl methyl-co-ethylbenzene methyl-co-methyl vinyl triethoxy silane siloxane |
| 29.39 | polydiethoxy siloxane |
| 10.30 | mica (muscovite) |
| | Part B |
| Volume % B | |
| 64.09 | titanium isopropoxide |
| 16.59 | heptanoic acid |
| | Polydiethoxy Siloxane |
| 19.32 | mica (muscovite) |

Mix Ratio is 64.65% A to 35.35% B by volume

This commercial embodiment corresponds to Example 5 as previously described.

Example 13

| Component | |
|---|---|
| Part A | |
| Volume % A | |
| 28.77 | 100 cs polydimethyl siloxane-silanol terminated |
| 22.80 | 1000 cs polydimethyl siloxane (triethyl silane and dimethyl ethoxy terminated) |
| 35.67 | poly(diethoxy siloxane) |
| 12.76 | mica (muscovite) |
| Part B | |
| Volume % B | |
| 52.50 | titanium isopropoxide |
| 30.73 | oleic acid |
| | poly (diethoxy siloxane) |
| 15.81 | mica (muscovite) |
| 0.96 | silver powder (1.0 micron) |

Mix ratio is 55.35% A to 44.65 B by volume

This commercial embodiment corresponds to Example 6 as previously described.

Example 14

| Component | |
|---|---|
| Part A | |
| Volume % A | |
| 22.23 | 100 cs polydimethyl siloxane-silanol terminated |
| 18.64 | 1000 cs polydimethyl siloxane (triethyl silane and dimethyl ethoxy terminated) |
| 21.70 | poly(decene) |
| 27.55 | poly(diethoxy siloxane) |
| 9.87 | mica (muscovite) |
| Part B | |
| Volume % B | |
| 63.28 | titanium isopropoxide |
| 16.38 | heptanoic acid |
| | poly (diethoxy siloxane) |
| 19.12 | mica (muscovite) |
| 1.22 | silver powder (1.0 micron) |

Mix Ratio is 65.95% A to 34.05% B by volume

This commercial embodiment corresponds to Example 7 as previously described.

Example 15

| Component | |
|---|---|
| Part A | |
| Volume % A | |
| 25.34 | 100 cs polydimethyl siloxane-silanol terminated |
| 31.94 | 1000 cs polydimethyl siloxane (triethyl silane and dimethyl ethoxy terminated) |
| 31.46 | poly(diethoxy siloxane) |
| 11.26 | mica (muscovite) |
| Part B | |
| Volume % B | |
| 53.87 | titanium isopropoxide |
| 13.95 | heptanoic acid |
| | poly (diethoxy siloxane) |
| 14.90 | aluminum oleate |
| 16.25 | mica (muscovite) |
| 1.03 | silver powder (1.0 micron) |

Mix ratio is 59.07% A to 40.93% B by volume

This commercial embodiment corresponds to Example 8 as previously described.

Example 16

| Component | |
|---|---|
| Part A | |
| Volume % A | |
| 23.07 | 100 cs polydimethyl siloxane-silanol terminated |
| 19.71 | 1000 cs polydimethyl siloxane (triethyl silane and dimethyl ethoxy terminated) |
| 19.71 | poly(octyl methyl-co-methyl vinyl triethoxy silane siloxane) |
| 28.23 | poly(diethoxy siloxane) |
| 9.28 | mica (muscovite) |
| Part B | |
| Volume % B | |
| 54.82 | titanium isopropoxide |
| 28.58 | oleic acid |
| | poly (diethoxy siloxane) |
| 15.53 | mica (muscovite) |
| 1.07 | silver powder (1.0 micron) |

Mix ratio is 62.05% A to 37.95% B by volume

This commercial embodiment corresponds to Example 1 as previously described.

Example 17

| Component | |
|---|---|
| Part A | |
| Volume % A | |
| 29.22 | 100 cs polydimethyl siloxane-silanol terminated |
| 11.18 | 1000 cs polydimethyl siloxane (triethyl silane and dimethyl ethoxy terminated) |
| 11.18 | poly(octyl methyl-co-methyl vinyl triethoxy silane siloxane) |
| 36.19 | poly(diethoxy siloxane) |
| 12.23 | mica (muscovite) |

-continued

| Component | |
|---|---|
| Part B | |
| Volume % B | |
| 54.83 | titanium isopropoxide |
| 28.62 | oleic acid |
| | poly (diethoxy siloxane) |
| 15.57 | mica (muscovite) |
| 0.97 | silver powder (1.0 micron) |

Mix ratio is 56.05% A to 43.95% B by volume

This commercial embodiment corresponds to Example 2 as previously described.

Example 18

| Component | |
|---|---|
| Part A | |
| Volume % A | |
| 24.19 | 100 cs polydimethyl siloxane-silanol terminated |
| 24.19 | 1000 cs polydimethyl siloxane (triethyl silane and dimethyl ethoxy terminated) |
| 8.03 | poly(octyl methyl-co-methyl vinyl triethoxy silane siloxane) |
| 32.56 | poly(diethoxy siloxane) |
| 11.04 | mica (muscovite) |
| Part B | |
| Volume % B | |
| 54.80 | titanium isopropoxide |
| 28.58 | oleic acid |
| | poly (diethoxy siloxane) |
| 15.57 | mica (muscovite) |
| 1.04 | silver powder (1.0 micron) |

Mix ratio is 58.74% A to 41.26% B by volume

This commercial embodiment corresponds to Example 3 as previously described.

Example 19

| Component | |
|---|---|
| Part A | |
| Volume % A | |
| 28.86 | 100 cs polydimethyl siloxane-silanol terminated |
| 23.43 | 1000 cs polydimethyl siloxane (triethyl silane and dimethyl ethoxy terminated) |
| 35.67 | poly(diethoxy siloxane) |
| 12.04 | mica (muscovite) |
| Part B | |
| Volume % B | |
| 54.80 | titanium isopropoxide |
| 28.59 | oleic acid |
| | poly (diethoxy siloxane) |

-continued

| Component | |
|---|---|
| 15.57 | mica (muscovite) |
| 1.05 | silver powder (1.0 micron) |

Mix ratio is 56.39% A to 43.61% B by volume

This commercial embodiment corresponds to Example 4 as previously described.

Example 20

| % by Weight | Component |
|---|---|
| 15.27 | titanium isopropoxide |
| 3.98 | propionic acid |
| 28.77 | polydiethoxy siloxane |
| 24.75 | mica (50 micron) |
| 17.19 | 100 cs polydimethylsiloxane-silanol terminated |
| 5.02* | 1000 cs polydimethyl siloxane (triethyl silane and dimethyl ethoxy silane terminated) |
| 5.22 | benzalkonium chloride |

*Phase separate components

This total formulation would be provided commercially in two parts as follows:

| Component | |
|---|---|
| Part A | |
| Volume % A | |
| 32.18 | 100 cs polydimethyl siloxane-silanol terminated |
| 9.41 | 1000 cs polydimethyl siloxane (triethyl silane and dimethyl ethoxy terminated) |
| 49.77 | poly(diethoxy siloxane) |
| 8.64 | mica (muscovite) |
| Part B | |
| Volume % B | |
| 53.88 | titanium isopropoxide |
| 13.26 | propionic acid |
| | poly (diethoxy siloxane) |
| 15.73 | mica (muscovite) |
| 17.13 | benzalkonium chloride |

Mix ratio is 64.55% A to 35.45% B by volume

Example 21

| % by Weight | Component |
|---|---|
| 13.93 | titanium isopropoxide |
| 3.6 | propionic acid |
| 26.25 | polydiethoxy siloxane |
| 22.58 | mica (50 micron) |
| 23.56 | 100 cs polydimethylsiloxane-silanol terminated |
| 5.02* | 1000 cs polydimethyl siloxane (triethyl silane and dimethyl ethoxy silane terminated) |
| 5.02* | benzalkonium chloride |

*Phase separate components

This total formulation would be provided commercially in two parts as follows:

| Component | |
|---|---|
| Part A | |
| Volume % A | |
| 37.96 | 100 cs polydimethyl siloxane-silanol terminated |
| 8.09 | 1000 cs polydimethyl siloxane (triethyl silane and dimethyl ethoxy terminated) |
| 39.07 | poly(diethoxy siloxane) |
| 6.78 | mica (muscovite) |
| 8.01 | benzalkonium chloride |
| Part B | |
| Volume % B | |
| 64.96 | titanium isopropoxide |
| 16.04 | propionic acid |
|  | poly (diethoxy siloxane) |
| 19.0 | mica (muscovite) |

Mix ratio is 73.65% A to 26.35% B by volume

Example 22

| % by Weight | Component |
|---|---|
| 14.72 | titanium isopropoxide |
| 3.84 | propionic acid |
| 27.74 | polydiethoxy siloxane |
| 23.86 | mica (50 micron) |
| 16.57 | 100 cs polydimethylsiloxane-silanol terminated |
| 10.28* | 1000 cs polydimethyl siloxane (triethyl silane and dimethyl ethoxy silane terminated) |
| 2.99* | benzalkonium chloride |

*Phase separate components

This total formulation would be provided commercially in two parts as follows:

| Component | |
|---|---|
| Part A | |
| Volume % A | |
| 29.11 | 100 cs polydimethyl siloxane-silanol terminated |
| 18.06 | 1000 cs polydimethyl siloxane (triethyl silane and dimethyl ethoxy terminated) |
| 45.02 | poly(diethoxy siloxane) |
| 7.81 | mica (muscovite) |
| Part B | |
| Volume % B | |
| 57.65 | titanium isopropoxide |
| 14.22 | oleic acid |
|  | poly (diethoxy siloxane) |
| 16.82 | mica (muscovite) |
| 11.31 | benzalkonium chloride |

Mix ratio is 68.28% A to 31.72% B by volume

Example 23

| % by Weight | Component |
|---|---|
| 15.18 | titanium isopropoxide |
| 4.0 | propionic acid |
| 28.59 | polydiethoxy siloxane |
| 24.60 | mica (50 micron) |
| 17.08 | 100 cs polydimethylsiloxane-silanol terminated |
| 10.59 | 1000 cs polydimethyl siloxane (triethyl silane and dimethyl ethoxy silane terminated) |

This total formulation would be provided commercially in two parts as follows:

| Component | |
|---|---|
| Part A | |
| Volume % A | |
| 29.12 | 100 cs polydimethyl siloxane-silanol terminated |
| 18.05 | 1000 cs polydimethyl siloxane (triethyl silane and dimethyl ethoxy terminated) |
| 45.01 | poly(diethoxy siloxane) |
| 7.82 | mica (muscovite) |
| Part B | |
| Volume % B | |
| 64.90 | titanium isopropoxide |
| 16.15 | propionic acid |
|  | poly (diethoxy siloxane) |
| 18.95 | mica (muscovite) |

Mix ratio is 70.8% A to 29.2% B by volume

Example 24

| % by Weight | Component |
|---|---|
| 17.36 | titanium isopropoxide |
| 4.0 | heptanoic acid |
| 16.39 | polydiethoxy siloxane |
| 27.32 | mica (50 micron) |
| 14.97 | 100 cs polydimethylsiloxane-silanol terminated |
| 7.49* | 1000 cs polydimethyl siloxane (triethyl silane and dimethyl ethoxy silane terminated) |
| 7.49* | 500 cs poly (15% diphenyl-co-dimethyl siloxane (triethyl silane and dimethyl ethoxy silane terminated) |
| 4.99 | benzalkonium chloride |

*Phase separation components

This total formulation would be provided commercially in two parts as follows:

| Component | |
|---|---|
| Part A | |
| Volume % A | |
| 29.84 | 100 cs polydimethyl siloxane-silanol terminated |
| 14.92 | 1000 cs polydimethyl siloxane |

| Component | |
|---|---|
| 14.92 | (triethyl silane and dimethyl ethoxy terminated) 500 cs poly (15% diphenyl-co-dimethyl siloxane) (triethyl silane and dimethyl ethoxy silane terminated) |
| 30.16 | poly(diethoxy siloxane) |
| 10.16 | mica (muscovite) |
| Part B | |
| Volume % B | |
| 55.68 | titanium isopropoxide |
| 13.10 | heptanoic acid |
| | poly (diethoxy siloxane) |
| 15.77 | mica (muscovite) |
| 15.45 | benzalkonium chloride |

Mix ratio is 60.85% A to 39.15% B by volume

Example 25

A hard composition can be formulated as follows:

| Component |
|---|
| Part A |

| Volume % A | |
|---|---|
| 30.07 | Polydiethoxy Siloxane |
| 16.01 | Silanol Terminated Polydimethyl Siloxane 4200 g/mol |
| 9.15 | Fumed Silica |
| 0.45 | Copper Phthalocyanine Blue Pigment |
| 10.77 | Dimethyl ethoxy and Triethyl silane terminated PDMS Starting material is vinyl terminated PDMS 26,000 g/mol |
| 9.26 | Polydecene |
| 9.97 | Certrimide |
| Part B | |
| Volume % B | |
| 13.72 | Titanium di-isopropoxide bis 2,4 pentanedionate 75% in isopropanol |
| 0.60 | Dibutyl Tin Dilaurate |

Example 26

A rubbery composition can be formulated as follows:

| Component |
|---|
| Part A |

| Volume % A | |
|---|---|
| 20.64 | Polydiethoxy Siloxane |
| 32.95 | Silanol Terminated Polydimethyl Siloxane 4200 g/mol |
| 6.27 | Fumed Silica |
| 0.31 | Copper Phthalocyanine Blue Pigment |
| 10.51 | Dimethyl ethoxy and Triethyl silane terminated PDMS Starting material is vinyl terminated PDMS 26,000 g/mol |
| 9.30 | Polydecene |
| 10.0 | Cetrimide |
| Part B | |
| Volume % B | |
| 9.42 | Titanium di-isopropoxide bis 2,4 pentanedionate 75% in isopropanol |
| 0.60 | Dibutyl Tin Dilaurate |

As may be appreciated, in providing the formulation to an end user, the organotitanate is maintained separate from the other components, particularly the polydimethyl siloxane silanol terminated and the polydiethoxy siloxane, to prevent the matrix from crosslinking and setting, such that all of the other components making up the formulation, can later be mixed together by an end user, in whatever mixture is appropriate provided the above-mentioned components are kept separate and the formulation can then either be brushed, rolled or sprayed onto the surface which is being coated.

The foregoing is illustrative of the present invention and is not to be construed as limiting thereof. The invention is defined by the following claims, with equivalents of the claims to be included therein.

That which is claimed is:

1. An antifouling composition, comprising:
    a) a glassy matrix formed by crosslinking a mixture of a silanol-terminated silicone and an alkoxy functionalized siloxane to provide an interpenetrating polymer network of glass and silicone; and
    b) at least two materials capable of microphase separation, at least one of which is graftable to the glass matrix.

2. The antifouling composition according to claim 1, further including an agent capable of preventing the deposition of slime.

3. The antifouling coating composition according to claim 2, wherein the agent capable of preventing the deposition of slime is selected from the group consisting of a surfactant, an emulsifier, an enzyme, a quaternary amine compound, a silver compound a sulfa-based antimicrobial compound, saponin, and cholesterol, and mixtures and blends thereof.

4. The antifouling composition according to claim 1, wherein the alkoxy functionalized siloxane is selected from the group consisting of polydimethylsiloxane, polydimethoxysiloxane, tetramethoxy silane and tetraethoxy silane.

5. The antifouling composition according to claim 1, wherein one of the materials capable of microphase separation and graftable into the glassy matrix is vinyl terminated polydimethylsiloxane polymer reacted with dimethylethoxy silane and triethyl silane using a hydrosilylation reaction.

6. The antifouling composition according to claim 1, wherein one of the materials capable of microphase separation is polydecene.

7. The antifouling composition according to claim 1, wherein one of the materials capable of microphase separation is a fluorotelomer intermediate.

8. The antifouling composition according to claim 1, wherein one of the materials of microphase separation and graftable into the glassy matrix is derived from a carboxylic acid containing a linear carbon chain of up to about C20.

9. The antifouling composition according to claim 8, wherein the carboxylic acid is selected from the group consisting of octanoic acid, heptanoic acid, hexanoic acid, decanoic acid, lauric acid, oleic acid, linoleic acid, linolenic acid and stearic acid.

10. The antifouling composition according to claim 1, wherein one of the materials capable of microphase separation is derived from a metal fatty acid complex.

11. The antifouling composition according to claim 10, wherein the metal fatty acid complex is selected from the group consisting of aluminum, magnesium, calcium and copper oleate and aluminum, magnesium, calcium, and copper stearate.

12. The antifouling composition according to claim 1, wherein one of the materials capable of microphase separation and graftable into the glassy matrix is an alkylhydrosiloxane polymer side-chained grafted with an alkene and vinyltriethoxy silane using a hydrosilylation reaction.

13. The antifouling composition according to claim 12, wherein the alkylhydrosiloxane polymer is methylhydroxysiloxane and the alkene is octene or styrene.

14. The antifouling composition according to claim 1, wherein the glassy matrix is crosslinked using an organotitanate or tin catalyst agent.

15. The antifouling composition according to claim 1, further including a filler selected from the group consisting of mica, silica, kaolin, bentonite, talc, zinc oxide, polytetrafluoroethylene powder, ultrahigh molecular weight polyethylene powder, high molecular weight polyethylene powder, medium and low molecular weight polyethylene powder, fumed silica and iron oxide.

16. A substrate coated with the antifouling composition according to claim 1.

17. An antifouling composition, comprising:
(a) 20 to 90 percent by weight of a glassy matrix formed by crosslinking a mixture of a silanol-terminated silicone and an alkoxy functionalized siloxane to provide an interpenetrating polymer network of glass and silicone;
(b) 1 to 30 percent by weight of at least two materials capable of microphase separation, at least one of which is graftable to the glass matrix; and
(c) 0.1 to 25 percent by weight of an agent capable of preventing slime.

18. The antifouling coating composition according to claim 17, wherein the agent capable of preventing the deposition of slime is selected from the group consisting of a surfactant, an enzyme, a quaternary ammonium compound a quaternary amine compound, a silver compound, a sulfa-based antimicrobial compound, saponin and cholesterol, and mixtures and blends thereof.

19. The antifouling composition according to claim 17, wherein the alkoxy functionalized siloxane is selected from the group consisting of polydimethylsiloxane, polydimethoxysiloxane, tetramethoxy silane and tetraethoxy silane.

20. The antifouling composition according to claim 17, wherein one of the materials capable of microphase separation and graftable into the glassy matrix is vinyl terminated polydimethylsiloxane polymer reacted with dimethylethoxy silane and triethyl silane using a hydrosilylation reaction.

21. The antifouling composition according to claim 17, wherein one of the materials capable of microphase separation is polydecene.

22. The antifouling composition according to claim 17, wherein one of the materials capable of microphase separation is a fluorotelomer intermediate.

23. The antifouling composition according to claim 17, wherein one of the materials of microphase separation and graftable into the glassy matrix is derived from a carboxylic acid containing a linear carbon chain of up to about C20.

24. The antifouling composition according to claim 23, wherein the carboxylic acid is selected from the group consisting of octanoic acid, heptanoic acid, hexanoic acid, decanoic acid, lauric acid, oleic acid, linoleic acid, linolenic acid and stearic acid.

25. The antifouling composition according to claim 17, wherein one of the materials capable of microphase separation is derived from a metal fatty acid complex.

26. The antifouling composition according to claim 25, wherein the metal fatty acid complex is selected from the group consisting of aluminum, magnesium, calcium, and copper oleate and aluminum, magnesium, calcium, and copper stearate.

27. The antifouling composition according to claim 17, wherein one of the materials capable of microphase separation and graftable into the glassy matrix is an alkylhydrosiloxane polymer side-chained grafted with an alkene and vinyltriethoxy silane using a hydrosilylation reaction.

28. The antifouling composition according to claim 27, wherein the alkylhydrosiloxane polymer is methylhydroxysiloxane and the alkene is octene or styrene.

29. The antifouling composition according to claim 17, wherein the glassy matrix is crosslinked using an organotitanate or tin catalyst agent.

30. The antifouling composition according to claim 17, further including a filler selected from the group consisting of mica, silica, kaolin, bentonite, talc, zinc oxide, polytetrafluoroethylene powder, ultrahigh molecular weight polyethylene powder, high, medium and low molecular weight polyethylene powder, fumed silica and iron oxide.

31. A substrate coated with the antifouling composition according to claim 18.

32. A method of treating a substrate to prevent fouling the method comprising the steps of:
(a) applying to the substrate a mixture of (i) a silanol-terminated silicone and an alkoxy functionalized, and (ii) at least two materials capable of microphase separation; and
(b) crosslinking the mixture to provide an interpenetrating polymer network of glass and silicone to which is grafted at least one of the materials capable of microphase separation.

33. The method according to claim 32, further including an agent capable of preventing the deposition of slime.

34. The method according to claim 33, wherein the agent capable of preventing the deposition of slime is selected from the group consisting of a surfactant, an emulsifier, an enzyme, a quaternary amine compound, a silver compound, a sulfa-based antimicrobial compound, saponin and cholesterol, and mixtures and blends thereof.

35. The method according to claim 32, wherein the alkoxy functionalized siloxane is selected from the group consisting of polydimethylsiloxane polydimethoxysiloxane, tetramethoxy silane, and tetraethoxy silane.

36. The method according to claim 32, wherein one of the materials capable of microphase separation and graftable into the glassy matrix is vinyl terminated polydimethylsiloxane polymer reacted with dimethylethoxy silane and triethyl silane using a hydrosilylation reaction.

37. The method according to claim 32, wherein one of the materials capable of microphase separation is polydecene.

38. The method according to claim 32, wherein one of the materials capable of microphase separation is a fluorotelomer intermediate.

39. The method according to claim 32, wherein one of the materials capable of microphase separation and graftable into the glassy matrix is derived from a carboxylic acid containing a linear carbon chain of up to about C20.

40. The method according to claim 39, wherein the carboxylic acid is selected from the group consisting of octanoic acid, heptanoic acid, hexanoic acid, decanoic acid, lauric acid, oleic acid, linoleic acid, linolenic acid and stearic acid.

41. The method according to claim 32, wherein one of the materials capable of microphase separation is derived from a metal fatty acid complex.

42. The method according to claim 41, wherein the metal fatty acid complex is selected from the group consisting of aluminum, magnesium, calcium and copper oleate and aluminum, magnesium, calcium, and copper stearate.

43. The method according to claim 32, wherein one of the materials capable of microphase separation and graftable into the glassy matrix is an alkylhydrosiloxane polymer side-chained grafted with an alkene and vinyltriethoxy silane using a hydrosilylation reaction.

44. The method according to claim 43, wherein the alkylhydrosiloxane polymer is methylhydroxysiloxane and the alkene is octene or styrene.

45. The method according to claim 32, wherein the glassy matrix is crosslinked using an organotitanate or tin catalyst agent.

46. The method according to claim 32, further including a filler selected from the group consisting of mica, silica, kaolin, bentonite, talc, zinc oxide, polytetrafluoroethylene powder, ultra high molecular weight polyethylene powder, high, medium and low molecular weight polyethylene powder, fumed silica, and iron oxide.

47. An antifouling composition, comprising:
   a) a glassy matrix formed by crosslinking a mixture of a functionally-terminated silicone and an alkoxy functionalized siloxane to provide an interpenetrating polymer network of glass and silicone; and
   b) at least two materials capable of microphase separation, at least one of which is graftable to the glass matrix.

48. The antifouling composition according to claim 47, further including an agent capable of preventing the deposition of slime.

49. The antifouling coating composition according to claim 48, wherein the agent capable of preventing the deposition of slime is selected from the group consisting of a surfactant, an emulsifier, an enzyme, a quaternary amine compound, a silver compound a sulfa-based antimicrobial compound, saponin, and cholesterol, and mixtures and blends thereof.

50. The antifouling composition according to claim 47, wherein the functionally-terminated silicone is selected from the group consisting of polydimethylsiloxane silanol terminated, vinyl terminated and amine terminated.

51. The antifouling composition according to claim 47, wherein the alkoxy functionalized siloxane is selected from the group consisting of polydimethoxysiloxane, polydimethoxysiloxane, tetramethoxy silane and tetraethoxy silane.

52. The antifouling composition according to claim 47, wherein one of the materials capable of microphase separation and graftable into the glassy matrix is vinyl terminated polydimethylsiloxane polymer reacted with dimethylethoxy silane and triethyl silane using a hydrosilylation reaction.

53. The antifouling composition according to claim 47, wherein one of the materials capable of microphase separation is polydecene.

54. The antifouling composition according to claim 47, wherein one of the materials capable of microphase separation is a fluorotelomer intermediate.

55. The antifouling composition according to claim 47, wherein one of the materials of microphase separation and graftable into the glassy matrix is derived from a carboxylic acid containing a linear carbon chain of up to about C20.

56. The antifouling composition according to claim 55, wherein the carboxylic acid is selected from the group consisting of octanoic acid, heptanoic acid, hexanoic acid, decanoic acid, laurie acid, oleic acid, linoleic acid, linolenic acid and stearic acid.

57. The antifouling composition according to claim 47, wherein one of the materials capable of microphase separation is derived from a metal fatty acid complex.

58. The antifouling composition according to claim 57, wherein the metal fatty acid complex is selected from the group consisting of aluminum, magnesium, calcium and copper oleate and aluminum, magnesium, calcium, and copper stearate.

59. The antifouling composition according to claim 47, wherein one of the materials capable of microphase separation and graftable into the glassy matrix is an alkylhydrosiloxane polymer side-chained grafted with an alkene and vinyltriethoxy silane using a hydrosilylation reaction.

60. The antifouling composition according to claim 59, wherein the alkylhydrosiloxane polymer is methylhydroxysiloxane and the alkene is octene or styrene.

61. The antifouling composition according to claim 47, wherein the glassy matrix is crosslinked using an organotitanate or tin catalyst agent.

62. The antifouling composition according to claim 47, further including a filler selected from the group consisting of mica, silica, kaolin, bentonite, talc, zinc oxide, polytetrafluoroethylene powder, ultrahigh molecular weight polyethylene powder, high molecular weight polyethylene powder, medium and low molecular weight polyethylene powder, fumed silica and iron oxide.

63. A substrate coated with the antifouling composition according to claim 47.

64. An antifouling composition, comprising:
   (a) 20 to 90 percent by weight of a glassy matrix formed by crosslinking a mixture of a functionally-terminated silicone and an alkoxy functionalized siloxane to provide an interpenetrating polymer network of glass and silicone;
   (b) 1 to 30 percent by weight of at least two materials capable of microphase separation, at least one of which is graftable to the glass matrix; and
   (c) 0.1 to 25 percent by weight of an agent capable of preventing slime.

65. The antifouling coating composition according to claim 64, wherein the agent capable of preventing the deposition of slime is selected from the group consisting of a surfactant, an enzyme, a quaternary ammonium compound a quaternary amine compound, a silver compound, a sulfa-based antimicrobial compound, saponin and cholesterol, and mixtures and blends thereof.

66. The antifouling composition according to claim 64, wherein the functionally-terminated silicone is selected from the group consisting of polydimethylsiloxane silanol terminated, vinyl terminated and amine terminated.

67. The antifouling composition according to claim 64, wherein the alkoxy functionalized siloxane is selected from the group consisting of polydimethoxysiloxane, polydimethoxysiloxane, tetramethoxy silane and tetraethoxy silane.

68. The antifouling composition according to claim 64, wherein one of the materials capable of microphase separation and graftable into the glassy matrix is vinyl terminated polydimethylsiloxane polymer reacted with dimethylethoxy silane and triethyl silane using a hydrosilylation reaction.

69. The antifouling composition according to claim 64, wherein one of the materials capable of microphase separation is polydecene.

70. The antifouling composition according to claim 64, wherein one of the materials capable of microphase separation is a fluorotelomer intermediate.

71. The antifouling composition according to claim 64, wherein one of the materials of microphase separation and graftable into the glassy matrix is derived from a carboxylic acid containing a linear carbon chain of up to about C20.

72. The antifouling composition according to claim 71, wherein the carboxylic acid is selected from the group of octanoic acid, heptanoic acid, hexanoic acid, decanoic acid, lauric acid, oleic acid, linoleic acid, linolenic acid and stearic acid.

73. The antifouling composition according to claim 64, wherein one of the materials capable of microphase separation is derived from a metal fatty acid complex.

74. The antifouling composition according to claim 73, wherein the metal fatty acid complex is selected from the group consisting of aluminum, magnesium, calcium, and copper oleate and aluminum, magnesium, calcium, and copper stearate.

75. The antifouling composition according to claim 64, wherein one of the materials capable of microphase separation and graftable into the glassy matrix is an alkylhydrosiloxane polymer side-chained grafted with an alkene and vinyltriethoxy silane using a hydrosilylation reaction.

76. The antifouling composition according to claim 75, wherein the alkylhydrosiloxane polymer is methylhydroxysiloxane and the alkene is octene or styrene.

77. The antifouling composition according to claim 64, wherein the glassy matrix is crosslinked using an organotitanate or tin catalyst agent.

78. The antifouling composition according to claim 64, further including a filler selected from the group consisting of mica, silica, kaolin, bentonite, talc, zinc oxide, polytetrafluoroethylene powder, ultrahigh molecular weight polyethylene powder, high, medium and low molecular weight polyethylene powder, fumed silica and iron oxide.

79. A substrate coated with the antifouling composition according to claim 64.

80. A method of treating a substrate to prevent fouling the method comprising the steps of:
  (a) applying to the substrate a mixture of (i) a functionally-terminated silicone and an alkoxy functionalized, and (ii) at least two materials capable of microphase separation; and
  (b) crosslinking the mixture to provide an interpenetrating polymer network of glass and silicone to which is grafted at least one of the materials capable of microphase separation.

81. The method according to claim 80, further including an agent capable of preventing the deposition of slime.

82. The method according to claim 81, wherein the agent capable of preventing the deposition of slime is selected from the group consisting of a surfactant, an emulsifier, an enzyme, a quaternary amine compound, a silver compound, a sulfa-based antimicrobial compound, saponin and cholesterol, and mixtures and blends thereof.

83. The method according to claim 80, wherein the functionally-terminated silicone is selected from the group consisting of polydimethylsiloxane silanol terminated, vinyl terminated and amine terminated.

84. The method according to claim 80, wherein the alkoxy functionalized siloxane is selected from the group consisting of polydiethoxysiloxane polydimethoxysiloxane, tetramethoxy silane, and tetraethoxy silane.

85. The method according to claim 80, wherein one of the materials capable of microphase separation and graftable into the glassy matrix is vinyl terminated polydimethylsiloxane polymer reacted with dimethylethoxy silane and triethyl silane using a hydrosilylation reaction.

86. The method according to claim 80, wherein one of the materials capable of microphase separation is polydecene.

87. The method according to claim 80, wherein one of the materials capable of microphase separation is a fluorotelomer intermediate.

88. The method according to claim 80, wherein one of the materials capable of microphase separation and graftable into the glassy matrix is derived from a carboxylic acid containing a linear carbon chain of up to about C20.

89. The method according to claim 80, wherein the carboxylic acid is selected from the group consisting of octanoic acid, heptanoic acid, hexanoic acid, decanoic acid, lauric acid, oleic acid, linoleic acid, linolenic acid and stearic acid.

90. The method according to claim 80, wherein one of the materials capable of microphase separation is derived from a metal fatty acid complex.

91. The method according to claim 90, wherein the metal fatty acid complex is selected from the group consisting of aluminum, magnesium, calcium and copper oleate and aluminum, magnesium, calcium, and copper stearate.

92. The method according to claim 80, wherein one of the materials capable of microphase separation and graftable into the glassy matrix is an alkylhydrosiloxane polymer side-chained grafted with an alkene and vinyltriethoxy silane using a hydrosilylation reaction.

93. The method according to claim 92, wherein the alkylhydrosiloxane polymer is methylhydroxysiloxane and the alkene is octene or styrene.

94. The method according to claim 80, wherein the glassy matrix is crosslinked using an organotitanate or tin catalyst agent.

95. The method according to claim 80, further including a filler selected from the group consisting of mica, silica, kaolin, bentonite, talc, zinc oxide, polytetrafluoroethylene powder, ultra high molecular weight polyethylene powder, high, medium and low molecular weight polyethylene powder, fumed silica, and iron oxide.

\* \* \* \* \*

UNITED STATES PATENT AND TRADEMARK OFFICE
CERTIFICATE OF CORRECTION

PATENT NO. : 6,559,201 B2
DATED : May 5, 2003
INVENTOR(S) : Simendinger, III

It is certified that error appears in the above-identified patent and that said Letters Patent is hereby corrected as shown below:

Column 16,
Line 47, should read -- the group consisting of polydiethoxysiloxane --

Column 17,
Line 52, should read -- the group consisting of polydiethoxysiloxane --

Column 18,
Line 33, should read -- according to claim 17. --
Line 54, should read -- of polydiethoxysiloxane polydimethoxysiloxane, ... --

Column 19,
Line 53, should read -- the group consisting of polydiethoxysiloxane, --

Column 20,
Line 8, should read -- decanoic acid, lauric acid, oleic acid, linoleic acid, linolenic --
Line 62, should read -- the group consisting of polydiethoxysiloxane, --

Column 22,
Line 28, should read -- 89. The method according to claim 88, wherein the --

Signed and Sealed this

Fourth Day of May, 2004

JON W. DUDAS
*Acting Director of the United States Patent and Trademark Office*